United States Patent [19]

Shiratsuki

[11] Patent Number: 4,591,877

[45] Date of Patent: May 27, 1986

[54] THERMAL RECORDING HEAD DEVICE

[75] Inventor: Yoshiyuki Shiratsuki, Kanagawa, Japan

[73] Assignee: Fuji Xerox Co., Ltd., Tokyo, Japan

[21] Appl. No.: 459,555

[22] Filed: Jan. 20, 1983

[30] Foreign Application Priority Data

Feb. 10, 1982 [JP] Japan .................................. 57-18787

[51] Int. Cl.[4] .............................................. G01O 15/10

[52] U.S. Cl. ................................ 346/76 PH; 400/120

[58] Field of Search ................. 346/1.1, 76 R, 76 PH, 346/154; 400/120; 364/518, 519; 219/216 PH, ; 101/93, 93.05; 250/316.1, 317.1, 318, 319; 358/296

[56] References Cited

U.S. PATENT DOCUMENTS 3,984,844 10/1976 Tanno et al. .......................... 346/76

4,149,171 4/1979 Sato et al. ....................... 346/76 PH 4,449,137 5/1984 Inui et al. ....................... 346/76 PH

*Primary Examiner*—A. Evans

*Attorney, Agent, or Firm*—Sughrue, Mion, Zinn, Macpeak & Seas

[57] ABSTRACT

A thermal recording head device and a method for operating a thermal recording head device in which a video signal representing an entire line of dots to be printed is simultaneously stored. The thermal recording head itself is composed of a belt-shaped resistive member having leads arranged in first and second groups of leads extending alternately therefrom. The leads of the first group are alternatingly connected to a power supply terminal while synchronously therewith bits of a video signal are alternately gated to control corresponding switching elements connected between the leads of the second group and ground. AND-OR gates are employed to perform the alternating connection between the register in which the video signal is stored. Switching elements, composed of bipolar transistors, are connected between the leads of the second group of leads and ground.

3 Claims, 3 Drawing Figures

THERMAL RECORDING HEAD DEVICE

BACKGROUND OF THE INVENTION

The present invention relates to a thermal recording head drive device used in a facsimile device or a printer. More particularly, the invention relates to a thermal recording head device of the type having electrodes extending, in a staggered manner, from a belt-shaped heat-generating resistive member.

In a conventional thermal recording head, especially in a line scanning thermal head, a belt-shaped heat generating resistive member is divided into a plurality of heat generating resistance elements, and video signal input leads, equal in number to the heat generating resistance elements, are arranged on one side of the belt-shaped heat generating resistive substrate. In this convention thermal head, if it is desired to record data with a high recording density and high quality, it is necessary to make the spacing between adjacent video signal input leads very small. As a result, it becomes difficult to connect the video signal input leads to the drive circuit.

In order to overcome the above-described difficulty, a thermal head as shown in FIG. 1 has been proposed. In FIG. 1, reference numeral 1 designates a substrate made of a ceramic plate or a substrate prepared by providing a heat sink of aluminum or copper on a ceramic base so as to provide suitable heat resisting and insulating characteristics and hence a suitable heat sinking action. Further, in FIG. 1, reference numeral 2 designates a belt-shaped heat generating resistive member which is formed using thin film, thick film or semiconductor techniques. The resistive member 2 is divided into a number of heat generating elements 2-1, 2-2, etc. corresponding to a predetermined number of recording positions. In order to improve the wear resistant property of the belt-shaped heat generating resistive member 2, a protective layer of glass, for instance, is formed on the member 2.

Further in FIG. 1, reference numerals 3 and 4 designate first and second lead groups which are used to supply current to the heat generating elements 2-1, 2-2, etc. The first lead group 3 includes leads 3-1, 3-2, etc., while the second lead group 4 includes a leads 4-1, 4-2, etc. These leads are arranged alternately on either side of the belt-shaped heat generating resistive member 2 in such a manner that the leads divide the resistive member 2 into the heat generating elements 2-1, 2-2, etc. with the elements 2-1, 2-2 being located between corresponding ones of the leads.

The thermal recording head described above has a number of alternate leads which serve as common leads for adjacent recording positions. Accordingly, the thermal recording head is advantageous in that the number of terminals on each side which must be connected to the drive circuit is reduced, and the spacing between leads is twice the size of the smallest dot which can be recorded.

In the conventional approach, the heat generating resistive element 2 is connected to the drive circuit as shown in FIG. 2. In FIG. 2, those components which have been described with reference to FIG. 1 are designated by the same reference numerals. In FIG. 2, reference numeral 5 designates a unidirectional element array, 6 video signal input gate array, 7 a video signal storing shift register, 8 power supply terminals, 9 video signal control terminals, and 10 a video signal input terminal.

If the power supply terminals 8-1 and 8-2 are simultaneously connected to the power source in the circuit described above and the video signal leads 4-1 is selected, for instance, both of the heat generating elements 2-1 and 2-2 generate heat. Therefore, the power supply terminals 8-1 and 8-2 must be separately connectable to the power source. Doing so effectively divides the heat generating element array into a first group of heat generating elements 2-1, 2-4, 2-5, 2-8, 2-9, etc. and a second group of heat generating elements 2-2, 2-3, 2-6, 2-7, 2-10, 2-11, etc.

In this arrangement, in recording one line, a printing operation including the following two steps must be carried out:

(1) Signals to be supplied to the heat generating elements 2-1, 2-4, 2-5, 2-8, 2-9, etc., for instance, are inputted to the shift register 7 through the video signal input terminal 10 while the powder supply terminal 8-1 is connected to the power source, thereby effecting printing of the picture elements corresponding to the elements 2-1, 2-4, 2-5, 2-8, 2-9, etc.

(2) Next, signals to be supplied to the heat generating elements 2-2, 2-3, 2-6, 2-7, 2-10, 2-11 etc. are inputted to the shift register through the video signal input terminal 10 while the power supply terminal 8-2 is connected to the power source, thereby effecting printing of the picture elements corresponding to the elements 2-2, 2-3, 2-6, 2-7, 2-10, 2-11, etc.

As is apparent from the above description, in recording one line, it is necessary to input video signals to the shift register 7 in two steps. For this purpose, an external memory circuit which is adapted to store half the video signals for one line must be provided. This is a serious drawback in the conventional thermal recording head.

An object of the invention is thus to provide a thermal recording head device in which the need for such an external memory circuit is eliminated, and signal transmission between such an external memory circuit and the shift register is also eliminated, whereby the printing speed is increased.

SUMMARY OF THE INVENTION

In order to achieve the object and other objects of the invention, instead of a shift register for one-half a line, a shift register for an entire line of video data is provided. Video signal input gate circuits in an array of such circuits between the shift register and the leads from the heat generating elements supply video data signals to the shift register alternately to the corresponding leads of the heat generating elements.

More specifically, the invention provides a thermal recording head device including a belt-shaped resistive member formed on an insulating substrate, a plurality of leads divided into first and second groups of leads with the leads of the two groups extending alternatingly from the belt-shaped resistive member and dividing the belt-shaped resistive member into a plurality of heat generating elements, a plurality of power supply terminals, means for selectively coupling leads of the first group to selected ones of the power supply terminals, a plurality of switching elements arranged in an array with each of the switching elements being connected between ground and a corresponding lead of the second group of leads, a register for storing bits of a video signal with the number of bits of the video signal being equal in number to the heat generating elements, and a plurality of video signal input gate circuits arranged between output bits of the register and corresponding ones of the switching elements. Each of the video signal input gate circuits has a plurality of inputs connected to corresponding outputs of the register and an output connected to a corresponding one of the switching elements in such a manner as to control the conductive state of the switching element. At least one control input of each of the video signal input gate circuits, to which is applied a video control signal, determines which of the output bits of the register is gated through the gate circuit to control the corresponding switching element.

DESCRIPTION OF THE PREFERRED EMBODIMENTS

Figure 1:
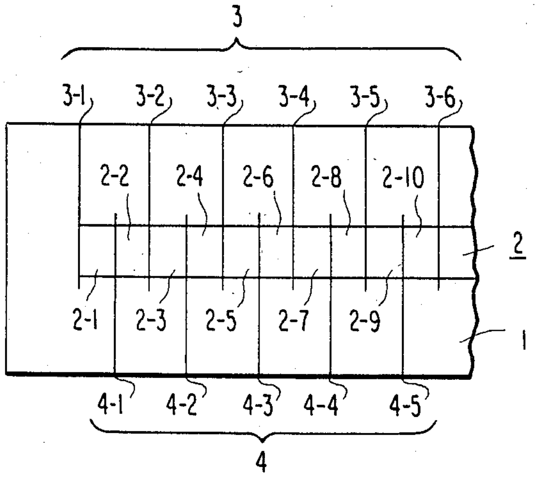
FIG. 1 PRIOR ART
FIG. 1 is a plan view of a thermal head to which the technical concept of the invention can be suitably applied.
Figure 2:
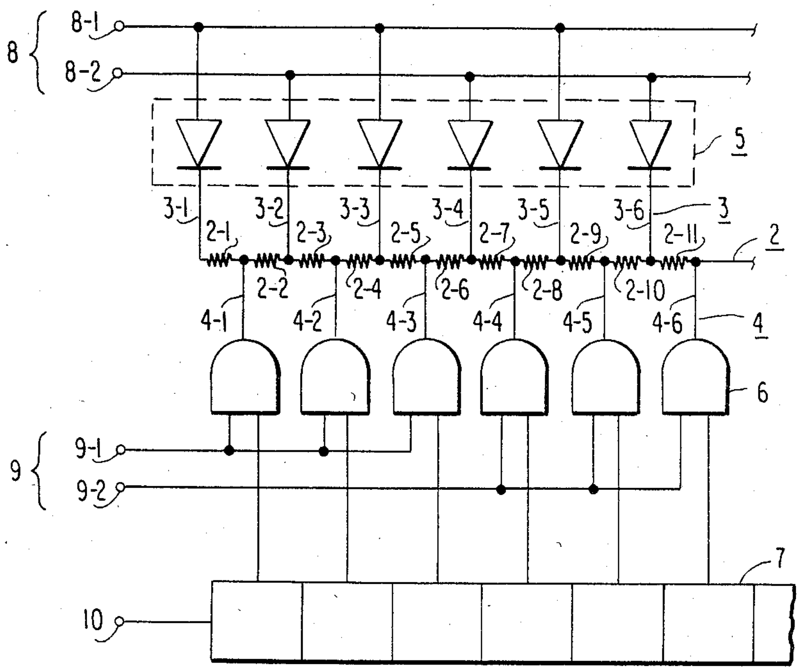
FIG. 2 PRIOR ART
FIG. 2 is a block diagram showing a conventional heat-sensitive recording device.
Figure 3:
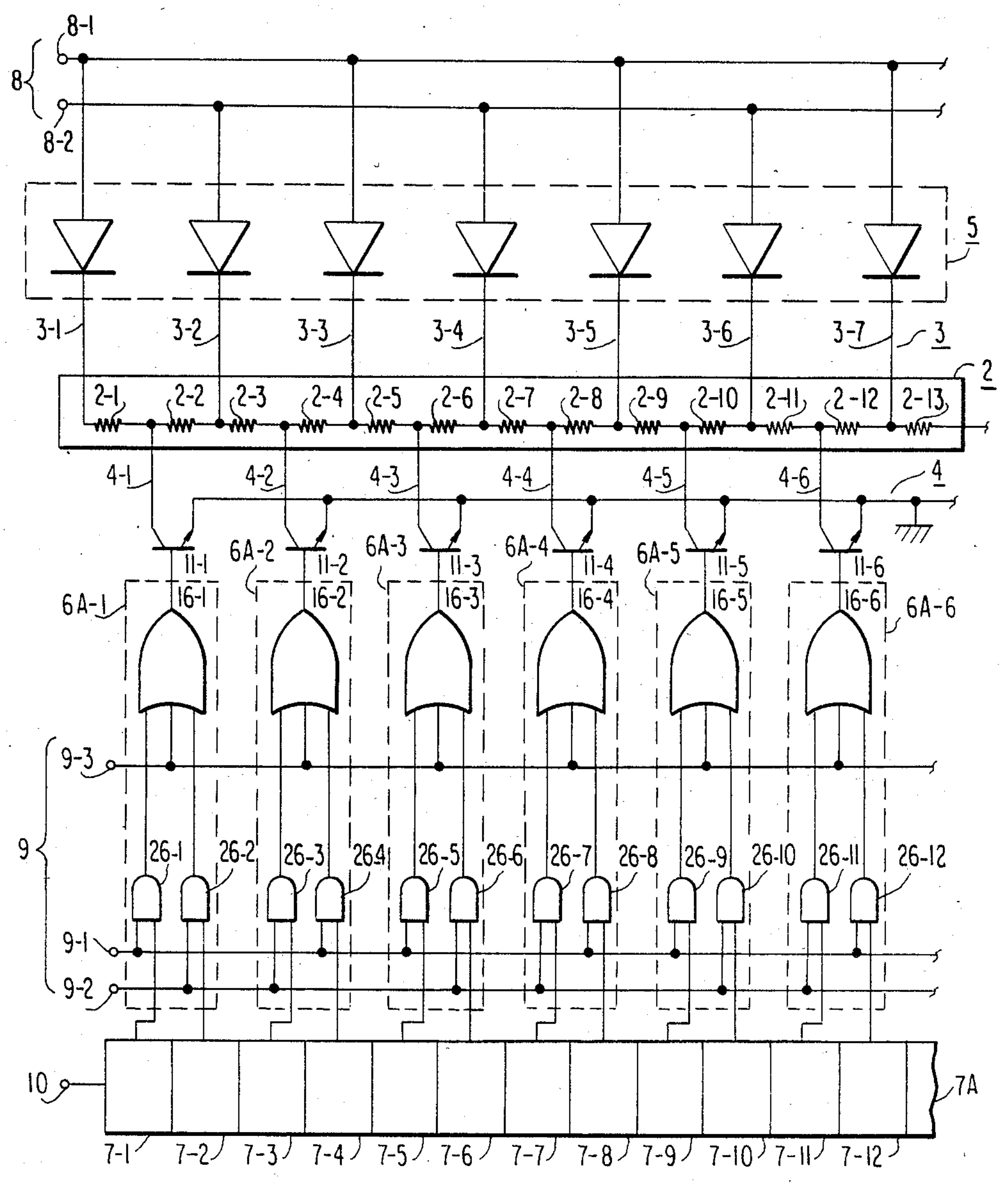
FIG. 3 is a block diagram of a preferred embodiment of a thermal head driving circuit of the invention.

The invention will be described with reference to a preferred embodiment shown in FIG. 3. In FIG. 3, components corresponding to those already described with reference to FIG. 2 are designated by corresponding reference numerals or characters.

In FIG. 3, 7A designates a video signal storing shift register having a capacity of the video signal data needed for one complete line, and 6A-1, 6A-2, etc. designate video signal input gate circuits arranged in an array in which each input gate circuit includes a pair of two-terminal AND gates 26-1, 26-2, etc., which receive digital signals from the shift register 7A as first inputs, and a three-terminal OR gate 16-1, 16-2, etc. which receives the outputs of the corresponding AND gates as first and second inputs. The odd-numbered AND gates 26-1, 26-3 etc. are opened and closed by a first control signal supplied to a terminal 9-1, while the even-numbered AND gates 26-2, 26-4 etc. are opened and closed by a second control signal supplied to a terminal 9-2. An "all-dot" printing signal supplied via a signal terminal 9-3 is applied to each of the OR gates 16-1, 16-2, etc.

Further in FIG. 3, reference numerals 11-1, 11-2, etc. designate switching transistors in an array, the bases of which are connected to the output terminals of respective ones of the OR gates 16-1, 16-2, etc. The emitter-collector circuits of these transistors are connected between ground and respective alternately provided leads 4-1, 4-2 etc. of the heat generating elements 2-1, 2-2 etc.

The relationships between the signals from the power supply terminals 8, the image signal control terminals 9 and the shift register 7A, the "on" and "off" states of the switching transistors 11-1, 11-2 etc., and the activation of the heat generating elements 2-1, 2-2, etc. are as indicated in the following Table 1:

In Table 1 below, it is assumed that all bits of the signal from the shift register 7A are at "H". In Table 1 and the other Tables below, reference character "L" is intended to mean "low logic level", reference character "H" is intended to mean "high logic level", and reference character "X" is intended to mean "undefined".

TABLE 1

| Control Mode | Power Supply Terminals 8-1 | Power Supply Terminals 8-2 | Video Signal Control Terminal 9-3 | 9-1 | 9-2 | Signal from Shift Register (all bits) | Switching Transistors Conductive (ON) | Heat Generating Elements Activated |
|---|---|---|---|---|---|---|---|---|
| A | ON | OFF | L | H | L | H | All | 2-1, 2-4 2-5, 2-8, 2-9, . . . |
| B | OFF | ON | L | L | H | H | All | 2-2, 2-3 2-6, 2-7, 2-10, 2-11, . . . |
| C | X | X | L | L | L | X | None | None |
| D | ON | ON | H | X | X | X | All | All |

As is apparent from Table 1, in control mode A, the heat generating elements 2-1, 2-4, 2-5, 2-8, 2-9 etc. are controlled by video signals stored at bit positions (stages) 7-1, 7-4, 7-5, 7-8, 7-9, etc. of shift register 7A, and in control mode B, the heat generating elements 2-2, 2-3, 2-6, 2-7, 2-10, 2-11, etc. are controlled by video signals stored at corresponding bit positions 7-2, 7-3, 7-6, 7-7, 7-10, 7-11, etc. In control mode C, none of the heat generating elements are activated independently of contents of the shift register 7A, and in control mode D, all the heat generating elements are activated independently of contents of the shift register 7A so that one line is recorded. In control mode C, both of the power supply terminals 8-1 and 8-2 may be in the "off" state. In this case, the video signal control terminals 9-1 through 9-3 may be either at "H" or at "L".

In Table 1, it is assumed that the signals from the shift register 7A are at the same level, that is, "H" for all bits. For more detailed description, it is assumed that the video signals stored at the various bit positions of the shift register 7A are as indicated in the following Table 2:

TABLE 2

| | Shift register bit 7-1 | 7-2 | 7-3 | 7-4 | 7-5 | 7-6 | 7-7 | 7-8 | 7-9 | 7-10 | 7-11 | 7-12 |
|---|---|---|---|---|---|---|---|---|---|---|---|---|
| Video signal | H | L | H | H | L | L | H | L | H | H | H | L |

In this case, the switching transistors rendered conductive and the heat generating elements activated to generate heat are as indicated in the following Table 3:

TABLE 3

| Control Mode | Power Supply Terminals 8-1 | 8-2 | Video Signal Control Terminal 9-3 | 9-1 | 9-2 | Switching Transistors Conductive (ON) | Heat Generating Elements Activated |
|---|---|---|---|---|---|---|---|
| A | ON | OFF | L | H | L | 11-1, 11-2, 11-5 | 2-1, 2-4, 2-9 |
| B | OFF | ON | L | L | H | 11-2, 11-4, 11-5 11-6 | 2-3, 2-7, 2-10 2-11 |

As is apparent from the above description, a printing operation for one line of data corresponding to the video signals stored in the shift register 7A is carried out using the video signal control modes A and B. In control modes C and D, the switching transistors 11-1, 11-2, etc. in an array are turned on and off simultaneously irrespective of the contents of the shift register 7A.

As is clear from the above description, according to the invention, the various heat generating elements are energized according to the contents of the shift register, which has a capacity equivalent to one line, in cooperation with the power supply terminal signals and the video signal control signals.

Furthermore, according to the invention, signals for one complete line are stored in the shift register simultaneously. Therefore, it is unnecessary to provide external memory circuits or the like. Accordingly, the data transfer time is reduced so that printing can be achieved at a high speed.

FIG. 3 shows merely one preferred embodiment of the invention, and the invention is not limited thereto or thereby. Specifically, the recording device may be modified (if the recording density thus produced is acceptable) by providing the leads 3 and 4 of FIG. 3 on one side of the heat generating resistive member and disposing the heat generating elements at one end of the substrate.

As is apparent from the above description, the drawbacks accompanying the conventional thermal head employing belt-shaped heat generating elements and alternately arranged leads of it not being possible to simultaneously apply the video signals for one line to the drive circuit and of it being necessary to externally provide video signal replacing circuits and video signal storing circuits are eliminated by the invention. That is, according to the invention, signals for one complete line can be stored simultaneously, with the result that printing can be carried out at high speed.

Furthermore, according to the invention, an all-bit non-printing control operation or an all-bit printing control operation can easily be performed. Because of this, the data transferring time which was heretofore required during white skipping is eliminated.

Moreover, with the invention, all the heat generating elements can be preheated by a current of a sufficiently low magnitude that no printing is caused by applying a high level signal to the terminal 9-3 in FIG. 3 and a low voltage to the power supply terminals 8-1 and 8-2. This preheating system provides a heat-sensitive recording device which can record data at higher speeds.

I claim:

1. A thermal recording head device comprising:

a belt-shaped resistive member formed on an insulating substrate;

a plurality of leads divided into first and second grounds of leads, said first and second groups of leads extending alternatively from said belt-shaped resistive member and dividing said belt-shaped resistive member into a plurality of heat generating elements;

a plurality of power supply terminals;

means for selectively coupling leads of said first group of leads to selected ones of said power supply terminals;

a plurality of switching elements arranged in an array, each of said switching elements being connected between a ground terminal and a corresponding lead of said second group of leads;

a register for storing video signal bits, said video signal bits being equal in number of said heat generating elements;

means for generating at least one video control signal;

a plurality of video signal input gate circuits arranged in an array for controlling a conductive state of corresponding ones of said switching elements, each of said video signal input gate circuits having signal inputs connected to predetermined corresponding outputs of said register, an output connected to a corresponding one of said switching elements, and at least one control input connected to receive at least one video control signal for controlling switch signal input of the gate circuit is gated to said output of said gate circuit;

wherein said means for selectively coupling leads of said first group of leads to said selected ones of said power supply terminals comprises a plurality of diodes, one of said diodes being provided for each lead of said first group of leads, and wherein said power supply terminals are two in number; and wherein each of said video signal input gate circuits comprises an AND-OR gate comprising first and second two-input AND gates and an OR gate having first and second inputs coupled to outputs of said AND gates, said AND gates each having a first input connected to a corresponding output of said register.

2. The thermal recording head device of claim 1, wherein each of said OR gates is provided with a third input, said third inputs of each of said OR gates being interconnected and connected to a source of an "ALL-DOT" printing signal.

3. The thermal recording head device of claim 1, wherein each of said switching elements comprises a bipolar transistor.

* * * * *